Jan. 13, 1925.
J. H. RICE
1,522,700
RACKING MECHANISM FOR KNITTING MACHINES
Filed Dec. 8, 1922   6 Sheets-Sheet 1
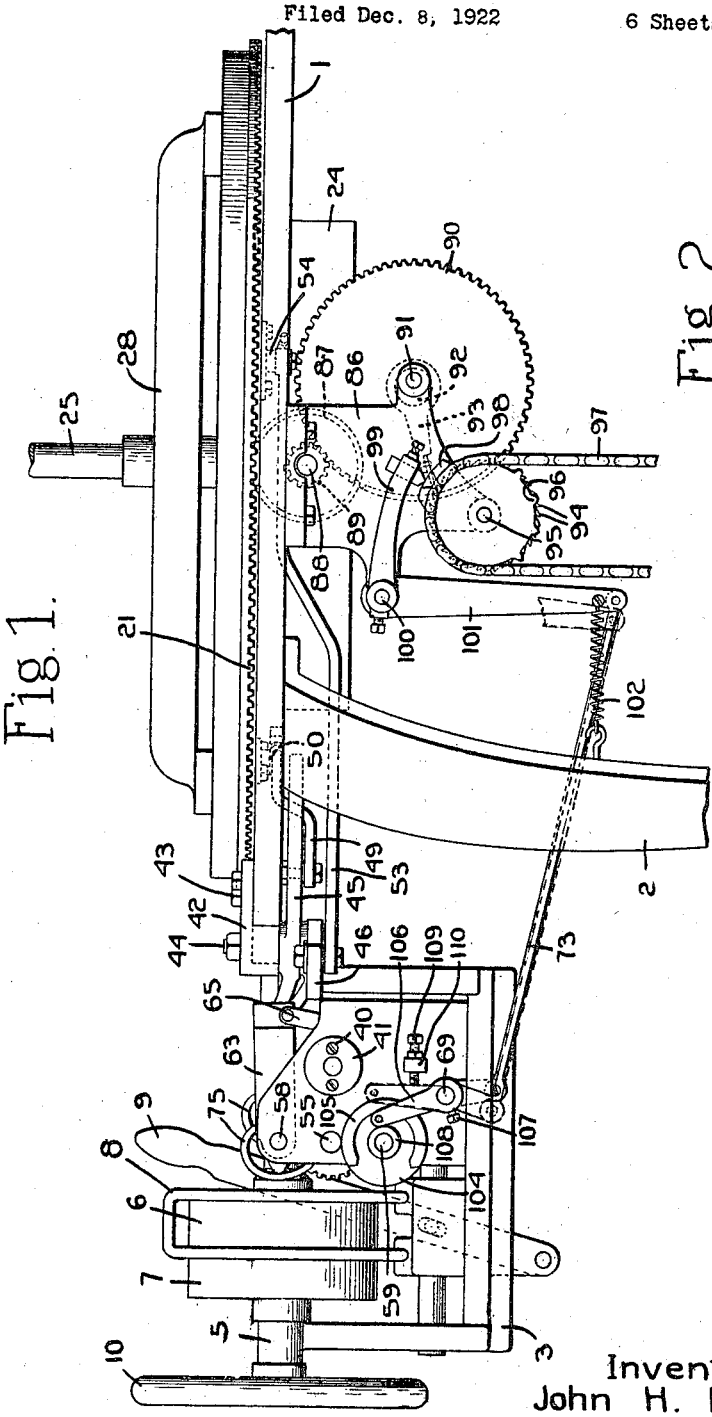
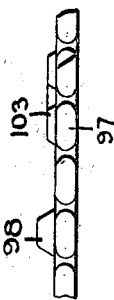
Inventor.
John H. Rice
by Heard Smith & Tennant
Attys.

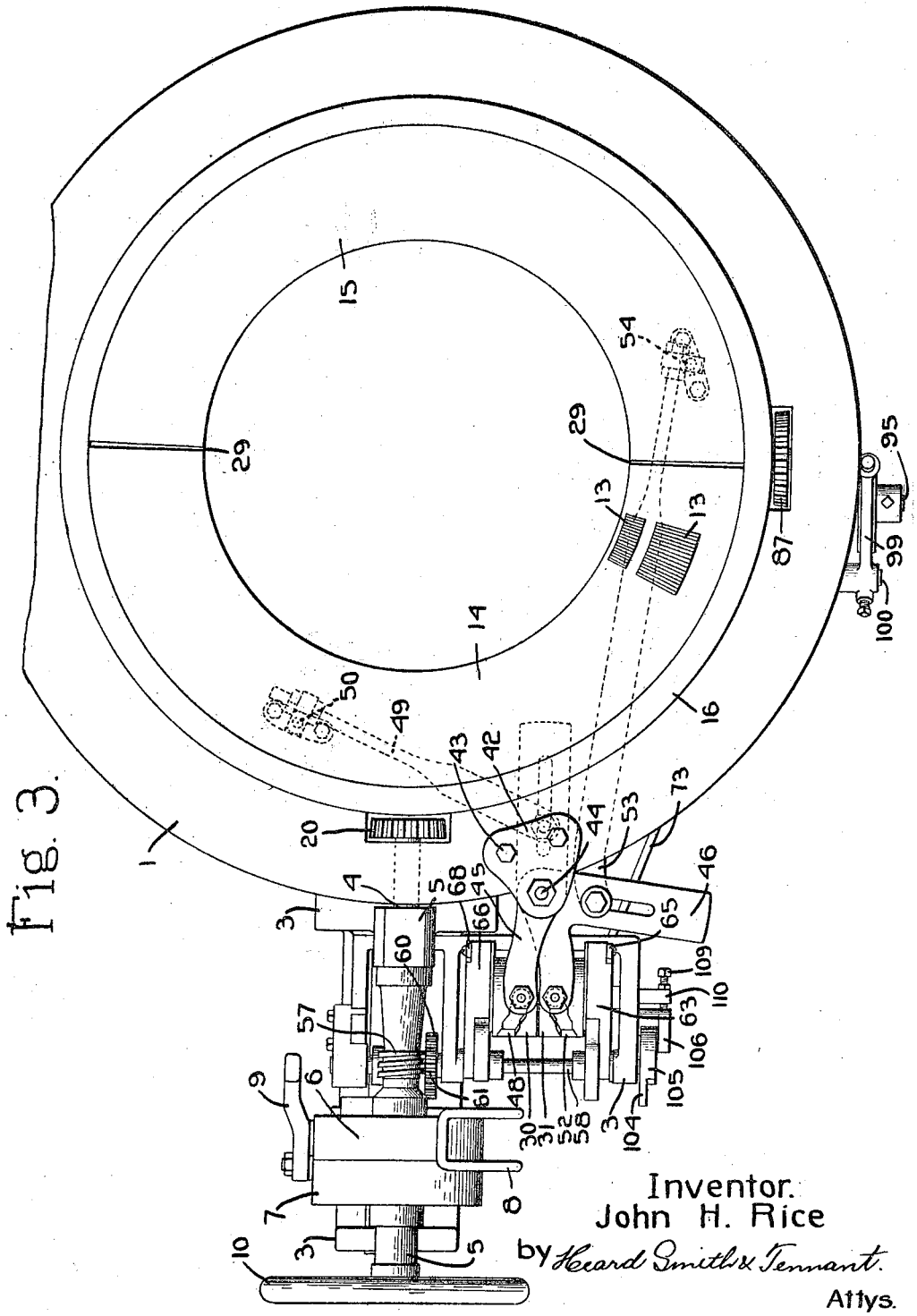

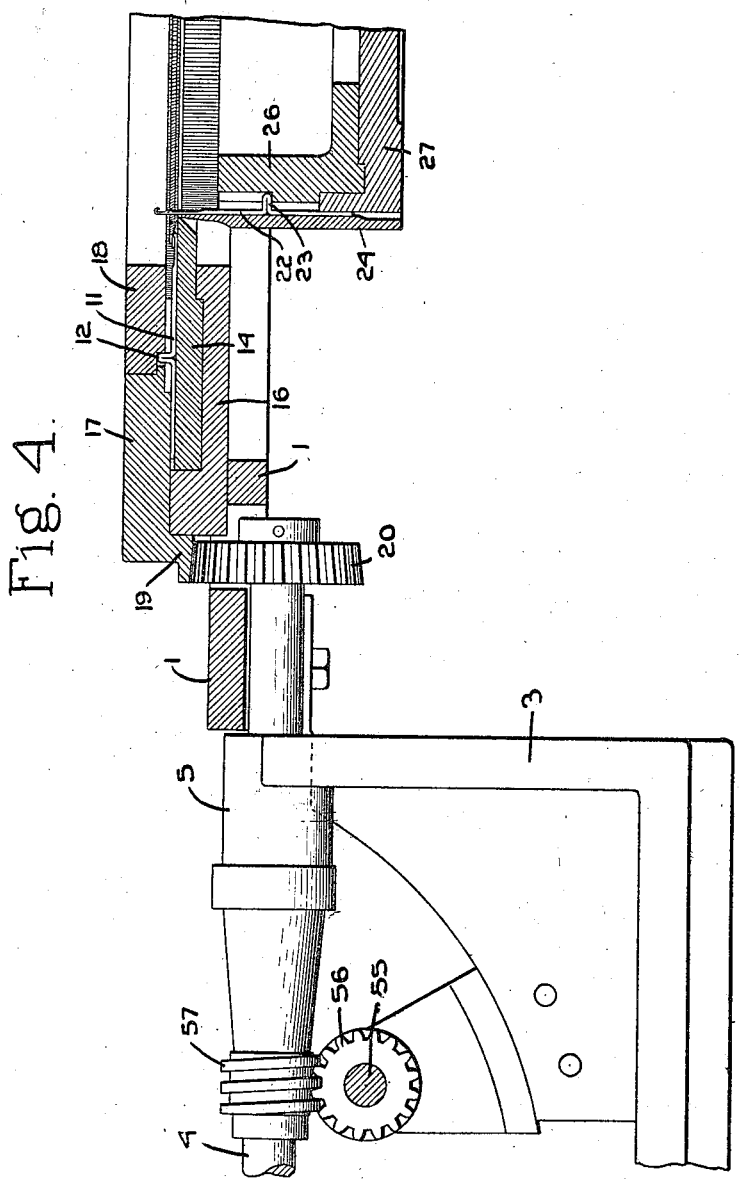

Jan. 13, 1925.

J. H. RICE

RACKING MECHANISM FOR KNITTING MACHINES

Filed Dec. 8, 1922

Inventor.
John H. Rice
by Heard Smith & Tennant.
Attys.

Jan. 13, 1925.

J. H. RICE 1,522,700

RACKING MECHANISM FOR KNITTING MACHINES

Filed Dec. 8, 1922

Inventor.
John H. Rice
by Heard Smith & Tennant.
Attys.

Jan. 13, 1925.

J. H. RICE 1,522,700

RACKING MECHANISM FOR KNITTING MACHINES

Filed Dec. 8, 1922    6 Sheets-Sheet 6

Inventor.
John H. Rice
by Heard Smith & Tennant.
Attys.

Patented Jan. 13, 1925.

1,522,700

UNITED STATES PATENT OFFICE.

JOHN H. RICE, OF MANCHESTER, NEW HAMPSHIRE, ASSIGNOR TO LEIGHTON MACHINE COMPANY, OF MANCHESTER, NEW HAMPSHIRE, A CORPORATION OF NEW HAMPSHIRE.

RACKING MECHANISM FOR KNITTING MACHINES.

Application filed December 8, 1922. Serial No. 605,607.

*To all whom it may concern:*

Be it known that I, JOHN H. RICE, a citizen of the United States, and resident of Manchester, county of Hillsborough, State of New Hampshire, have invented an Improvement in Racking Mechanism for Knitting Machines, of which the following description, in connection with the accompanying drawing, is a specification, like characters on the drawing representing like parts.

This invention relates to improvements in knitting machines provided with two sets of needles for knitting ribbed work in which a relative racking or shogging movement between the sets of needles is provided at predetermined times to produce the peculiar fancy effect known as the racked stitch. Knitting machines upon which the racking operation is performed are in general of two types according to whether the needles are given the racking movement by bending or twisting one set of needles or by splitting the needle bed into sections and moving these sections bodily to rack the needles. The present invention in its broader aspects and in certain features is applicable to both types of machines but it is particularly applicable to the split or sectional needle bed type of machine and is herein illustrated in its preferred form in connection with such a machine.

Various arrangements of the two sets of needles in a knitting machine for knitting ribbed work are also common and well known and the invention is likewise applicable to a wide variety of such arrangements but it is particularly applicable to that type of knitting machine employing a set of cylinder needles mounted to move vertically and a set of dial needles mounted to move horizontally and radially exteriorly of the cylinder needles and a preferred form of the invention is herein illustrated in connection with the latter type of machine.

The main object of the present invention is to provide means for racking the needles for a plurality of steps in either direction and preferably with any desired sequence in the number and direction of the steps. For example, in the machine herein illustrated, one set of the needles may be racked with respect to the other set for a plurality of three steps or any less number of steps in either direction; for a lesser number, that is two or one, in either direction; and any desired sequence in the number and erection of the steps within the limit of the machine may take place. Thus the machine may rack successively for three steps in one direction and for three steps in the opposite direction; for two steps in one direction, one step in the opposite direction, one step in the one direction and two steps in the opposite direction; one step in the one direction, two steps in the opposite direction, two steps in the one direction, and one step in the opposite direction; alternately one step in the one direction and one step in the opposite direction for six steps; and so on. At the end of any racking step the machine may knit plain ribbed work and then proceed with the racking operation.

The object of this invention is thus to provide a machine in which a wide variety of patterns or designs of knitting may be performed. By leaving out needles at various points and by other means well known in the art a variety of ribbed effects may be produced and by combining these effects with the large number of racking effects produced by this invention an almost endless variety of designs and patterns may be produced in the knitted web.

The object of the invention is further to provide for racking one set of needles with respect to the other by racking annular sections of the needles successively and providing for the independent control of the movement of each section.

These and other objects and features of the invention will appear more fully from the accompanying description and drawings and will be particularly pointed out in the claims.

The drawings illustrate a knitting machine of the well known circular type employing an interior set of vertical needles and an exterior set of horizontally disposed dial needles. As this type of machine is well known and familiar to those skilled in the art and as the present invention, while producing strikingly novel and valuable results, is embodied in its preferred form in certain changes and additions to the machine, it is necessary to illustrate and describe in detail only those parts of the machine with which the invention is particularly concerned.

The general construction and operation of such a knitting machine is quite fully set forth in my prior patent No. 1,215,411 granted February 13, 1917, and in a still earlier patent granted to George A. Leighton and myself, No. 596,301 of December 28, 1897. In the machine herein set forth to illustrate a preferred embodiment of the present invention the split needle bed construction is employed rather than the construction in which the needles are bent or twisted to provide the racking movement because the racking for a plurality of steps as required by this invention is more readily and efficiently performed by the split bed construction.

In the drawings;

Fig. 1 is a side elevation of so much of a knitting machine as is necessary to illustrate the invention;

Fig. 2 is a detail of one form of pattern chain;

Fig. 3 is a plan view of the machine with certain parts removed;

Fig. 4 is an enlarged detail view of a portion of a machine partially in side elevation and partially in cross section chiefly taken on the radial axis passing through the main shaft;

Figure 5:
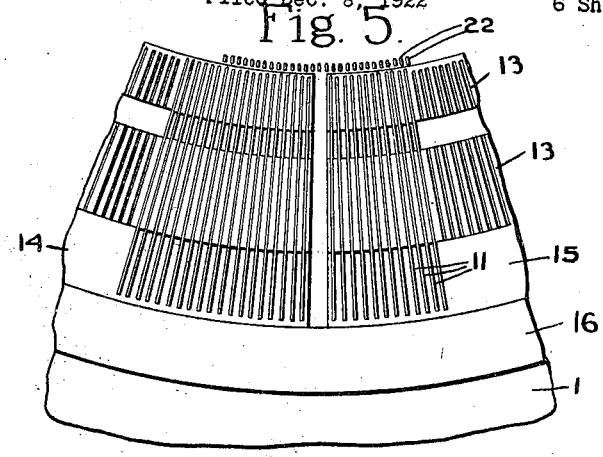
Fig. 5 is a detail plan view of a segmental portion of the machine showing the relation of the dial and cylinder needle bed slots and needles at the adjacent ends of the racking dial needle bed sections.

The machine as illustrated presents the usual circular or annular bed plate 1 supported in any suitable manner as from the floor by legs or standards one of which 2 is illustrated. This bed plate carries at one side, integral therewith or rigidly secured thereto the bracket or stand 3. The main shaft 4 is journalled in suitable bearings 5 in this bracket or stand and extends horizontally and radially of the machine. This shaft is provided with the usual fast and loose pulleys 6 and 7 to which a belt, not shown, runs from a suitable source of power. A belt shifter 8 is provided which may be manually operated by a hand lever 9 and which also may be controlled by suitable automatic stop mechanism, not shown but well known in this type of machine. A hand wheel wheel 10 on the main shaft enables the machine to be turned over manually.

The dial needles 11, which are illustrated as of the well known latch type provided with the usual operating butts 12, are mounted for radial reciprocation in the grooves 13 of the annular dial needle bed. This dial needle bed is divided into two sections 14 and 15 and these sections are mounted for rotary movement in an annular recess in the dial needle bed guide 16 secured to or forming a part of the bed plate 1.

The dial needles are given their necessary reciprocatory movements and thrown into and out of action as required in the usual manner by cams formed in or carried by the dial cam plate made in two concentric annular sections 17 and 18. This dial cam plate rests, near its periphery, upon the upper surface of the dial needle bed guide 16 and at its periphery is provided with a depending rim 19 fitting against the vertical periphery of the dial needle bed guide 16 so that the dial cam plate rotates concentrically of the dial needle bed. The desired rotary movement is imparted to the dial cam plate by a bevelled gear 20 on the main shaft 4 engaging gear teeth 21 formed in the lower peripheral surface of the dial cam plate.

The cylinder needles 22, also shown of the usual latch type provided with the butts 23, are mounted for vertical reciprocation in an interiorly grooved vertical needle cylinder 24 supported on the bottom of the central vertical shaft 25 and held against rotary movement in the usual manner. The usual and necessary movements of the cylinder needles are effected by the cylindrical cam plate 26, resting upon and guided by the bottom 27 of the needle cylinder. This cam cylinder 26 is connected to the shaft 25 which in turn is connected to and supported by the yoke 28 secured at its ends to the dial cam plate 17. Consequently the cylinder cam 26 rotates with the dial cam plate 17 and 18 in the usual manner.

The foregoing will be sufficient for an understanding of the general construction and operation of this type of knitting machine which has been selected in connection with a disclosure of a preferred form of the present invention. It will be understood, of course, that the machine is provided with suitable take up mechanism, yarn feeds and other adjunctive and accessory devices as may be required.

When knitting ribbed work the dial needle bed sections 14 and 15 will usually stand as illustrated in Fig. 3. Spaces 29 are left between the adjacent ends of the sections of a width equal to the distance between the centers of adjacent needles. This is necessary in order to provide for the relative racking or shogging movement of the dial needle bed sections and while it results in a vertical stripe being knit at opposite sides of the web this is not found to be objectionable.

The racking or shogging movements of the dial needle bed sections 14 and 15 are imparted independently to the sections from the cam drums 30 and 31 mounted loosely on the shaft 32 journalled at one end in a portion of the bracket or stand 3 and at the other end in a sleeve 33 mounted in a portion of the bracket or stand 3. The drums, at their adjacent sides, are provided with an interposed thrust ball bearing 34 and at their opposite sides with projecting hubs 35 and 36 respectively to which are secured the actuating ratchet wheels 37 and 38. The hub 35 seats against a thrust washer 39 and the two drums are held snugly in their longitudinal position on the shaft 32 by means of the sleeve 33 which abuts against the hub 36 and is longitudinally adjustable by means of the screws 40 passing through the head 41 of the sleeve into the bracket 3. Movement is imparted from the drums to the dial needle bed section by suitable connections. A bracket 42 is bolted at 43 to the bed plate 1 and supports a vertical stud 44 upon which are fulcrumed the two levers 45 and 46. The lever 45 at one end carries a follower 47 riding in the groove 48 of the drum 30 and at its other end has an adjustable pin and slot connection with a link 49 adjustably secured at 50 to the section 14. In a similar manner the lever 46 which is in the form of a bell crank carries at one end the follower 51 riding in the groove 52 of the drum 31 and at its other end is connected by an adjustable pin and slot connection to a link 53 in turn adjustably connected at 54 to the section 15.

Figure 7:
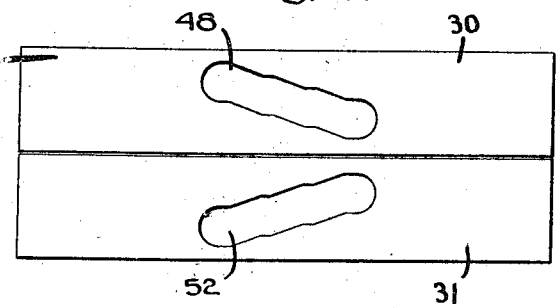
Fig. 7 is a development of the cam surfaces for the control of the racking needle bed sections.
Figure 6:
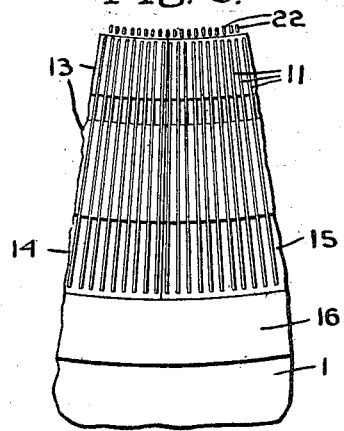
Fig. 6 is a view similar to Fig. 5 showing a different position of the parts.
Figure 8:
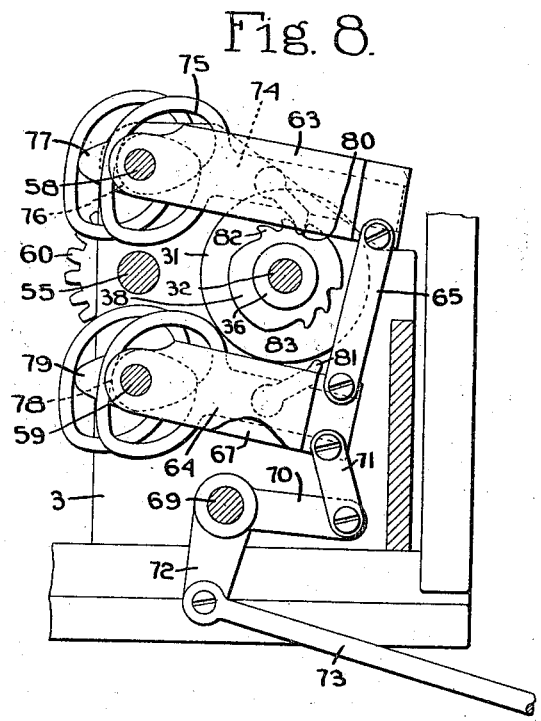
Fig. 8 is a detail chiefly in side elevation of the mechanism employed in the preferred form of the invention illustrated for racking the needle bed sections.
Figure 9:
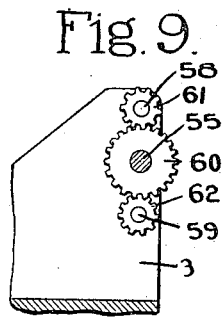
Fig. 9 is a detail on a smaller scale showing an arrangement of gearing employed in the construction illustrated in Fig. 8.
Figure 10:
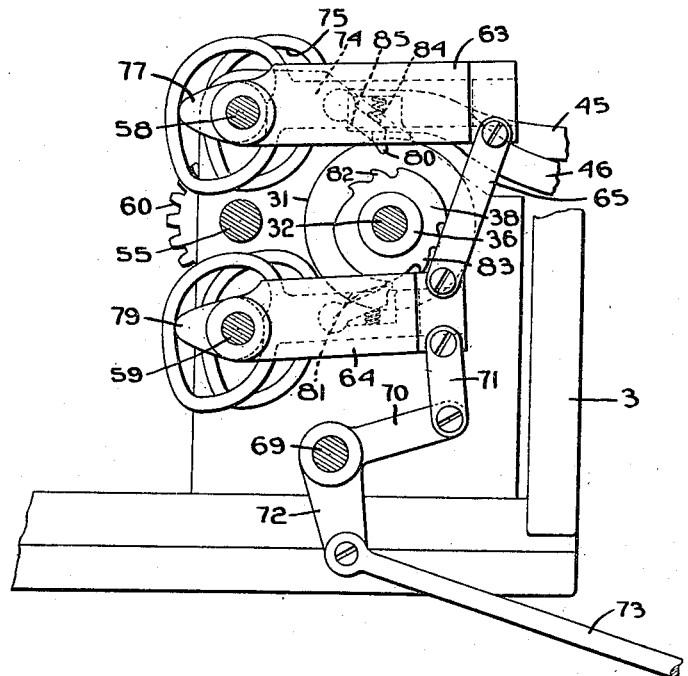
Fig. 10 is a view similar to Fig. 8 showing the parts in a different position.
Figure 11:
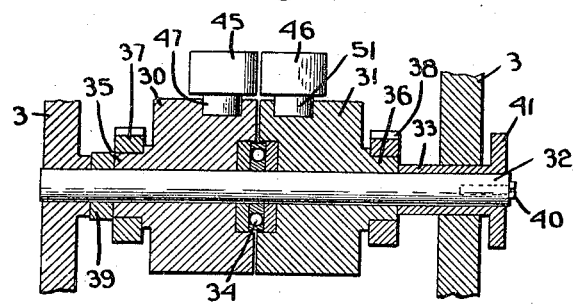
Fig. 11 is a view in vertical cross section taken through the axis of the cam drums which act independently to rack the needle bed sections.

It will thus be seen that each dial needle bed section is independently controlled in its racking movement by its own independently movable drum. Thus any desired number of racking or shogging steps may be independently given in either direction and any desired sequence to the respective directions depending upon the shape of the cam grooves 48 and 52 and the movements imparted to the drums and the various adjustments for which provision is made. It is found in practice that a plurality of three racking or shogging steps, requiring four positions of the followers in the cam grooves, of the drums give such a wide variety of pattern and designs of racked or shogged work that this number is illustrated herein for a preferred embodiment of the invention. But it is obvious that this number may be increased, if desired. In Figure 7 the surfaces of the drums 30 and 31 with the cam grooves 48 and 52 respectively are shown developed, the four straight portions of each groove illustrating the positions the follower will assume at the beginning or end of a racking or shogging movement and the three inclined portions effecting the racking or shogging movement as the follower moves from one straight portion to the next straight portion.

Various means may be employed within the scope of this invention for giving the requisite movements to the actuating cam drums 30 and 31. A simple and preferred construction is illustrated for this purpose. A shaft 55 is mounted in the stand or bracket 3 extending transversely of the main shaft 4 and parallel with the drum shaft 32. This shaft carries a worm wheel 56 driven by a worm 57 on the main shaft 4 so that the shaft 55 is constantly driven in the same direction. Above and below and parallel with the shaft 55 in the bracket or stand 3 are mounted the shafts 58 and 59 driven in the same direction from the shaft 55 by means of the gear 60 on the shaft 55 intermeshing with the pinions 61 and 62 on the shafts 58 and 59 respectively. These shafts are conveniently utilized to reciprocate two sets of pawls, one set of which acts to rotate the drums in one direction and the other set in the opposite direction.

A shifting frame is provided under the control of a pattern mechanism to shift the sets of pawls into and out of engagement with their respective ratchet wheels. In the construction illustrated this shifting frame comprises the side bars 63 and 64 pivoted respectively at one end to the shafts 58 and 59 adjacent the drum 31 and connected at the other end by the link 65 and the side bars 66 and 67 pivoted respectively at one end to the shafts 58 and 59 adjacent the drum 30 and connected at the other end by the link 68. A horizontal shaft 69 is journalled beneath the shifting frame in the bracket 3 and is provided with laterally extending arms 70 connected by links 71 to the side bars 64 and 67 and with a depending arm 72 connected by a link 73 to a suitable pattern mechanism. Consequently as the shaft 69 is rocked by the pattern mechanism the shifting frame may be moved to its lowermost position to effect the actuation of the drums in one direction, to its uppermost position to effect the actuation of the drums in the opposite direction, or to an intermediate neutral position.

Each side bar of the shifting frame is provided with a reciprocating pawl carrier all four of which are shown as of similar construction. Each comprises a shank 74 slidable longitudinally of its side bar in a way or groove formed therein, each is provided with a cam-shaped recess or opening 75 to embrace a cam on the shaft 58 or 59, and each is provided with a pawl pivotally mounted thereon to cooperate with one of the ratchet wheels on one of the drums. The cams 76 and 77 for operating the upper set of pawl carriers are mounted on the shaft 58 180° apart and the cams 78 and 79 for operating the lower set of pawl carriers are similarly mounted on the shaft 59 so that the pawl carriers in the side bars 63 and 64 which carry respectively the pawls 80 and 81 for operating the ratchet wheel 38 of the drum 31 have their movements in opposite phases to those for operating the drum 30. Each ratchet wheel 38 and 37 is provided with two sets of reversely disposed ratchet teeth, the teeth 82 when actuated by the pawl 80 rotating the drum 31 in the one direction and the teeth 83 when actuated by the pawl 81 rotating the drum 31 in the opposite direction. The position and number of these teeth is such and the actuating stroke of the pawls is such that the proper movement is given to the drum 31 to shift the cam groove 52 from one position to another and thus rock the lever 46. In a similar manner the mechanism at the other side operates to move the drum 30 and rock the lever 45. Each pawl is held normally by a spring, one of which is shown at 84 in connection with the pawl 80, toward the ratchet wheel and its movement in that direction with respect to the pawl carrier is limited by a stop 85.

The pattern mechanism illustrated as an exemplification of a suitable means for moving the link 73 and thereby shifting the shifting frame carrying the pawl carriers so as to bring the one or the other set into co-operation with the drums or into a neutral position is of a generally similar type to that illustrated in my prior patent No. 1,215,411. A bracket 86 is secured to and depends from the annular bed plate 1. A bevel gear 87 mounted on a shaft 88 in this bracket intermeshes with and is driven by the gear teeth 21 of the dial cam plate. The shaft 88 in turn carries a pinion 89 which intermeshes with and drives a large gear 90 mounted on a shaft 91 in the bracket 86. This shaft 91 carries an eccentric 92 which reciprocates a pawl 93. The pawl in turn engages a ratchet wheel 94 mounted on a shaft 95 in the bracket 86 and this shaft carries a sprocket wheel 96 on which rides the pattern chain 97. It will thus be seen that as the machine is driven and the dial cam plate rotated the pawl 93 will give a step by step movement to the pattern chain 97. This pattern chain is provided at suitable intervals as required to produce the desired pattern with lugs 98 which are not only adjustable as to position but as to length. These lugs as they pass beneath the arm 99 mounted on the shaft 100 in the bracket 86 rock that arm and with it the depending arm 101 secured to the shaft 100 and pull on the link 73 and through the mechanism already described shift the shifting frame to its uppermost position bringing the lower set of pawls into co-operation with the drums. When the lugs pass from beneath the arm 99 the spring 102 acts to swing the arms 99 and 101 in the opposite direction until the arm 99 rests upon the chain and the link 73 is moved to shift the shifting frame to its lowermost position and bring the upper set of pawls into co-operation with the drums. If it is desired to shift the shifting frame to an intermediate or neutral position the pattern chain 97 may be provided with lugs 103 as shown in Figure 2 for that purpose.

It is desirable to provide means to insure that both sections of the needles shall be successively racked or shogged in the same direction at least one step when a shogging movement has begun and that neither needle section shall be shogged while its needles are taking yarn and knitting and that there shall be no reversal of the shogging movement until both sections of the needles have been shogged at least one step in the first direction. Otherwise there would be a smash, needles would be broken and the machine injured. Such a result may happen from a misplacement of the controlling lugs on the pattern chain or of the pattern chain itself. When, as is usually the case, the machine is arranged to operate with the shifting frame in either its uppermost or lowermost position a simple and effective locking means may be provided of the form shown in Figure 1. A disk 104 is secured to the exterior end of one of the shafts 58 or 59 and is herein shown on the latter. This disk is provided with a laterally projecting annular rim 105 through about three fourths of its circumference. The arc of the opening between the ends of the rim corresponds in length and angular position to one of the dwell sections of the cams 75 which occur in each cam when the corresponding reciprocating pawl carrier is at each end of its reciprocating movement. An arm 106 is adjustably and removably secured by a set screw 107 to the shaft 69 and is provided with a follower which rests against either the inner or the outer periphery of the rim 105. When in the former position (as shown in full lines) it is prevented from movement in the opposite direction by a hub 108 on the disk 104 and when in the latter position (as shown in dotted lines) is prevented from movement in the opposite direction by an adjustable set screw 109 mounted in a lug 110 on the stand or bracket 3.

It will thus be seen that the shaft 69 can only be rocked to shift the shifting frame carrying the pawls from one position to the other when the opening between the ends of the rim 105 is opposite the follower at the end of the arm 106. This occurs but once in each complete rotation of the shafts 58 and 59 and then only when the pawls are at the ends of their reciprocating movements. Consequently such a shift can only be made after both pawls of either the lower set or the upper set have made one complete reciprocation and, therefore, moved both drums one step in either one direction or the other.

When it is desired to have the machine operate with the shifting frame in a neutral position the locking means thus described may be removed from the machine or rendered ineffective by loosening the set screw 107 and removing the arm 106 from the machine.

The general operation of the machine will be clear from the foregoing detailed description and it will be apparent that it enables a wide variety of racking or shogging movements to be made and a consequent wide variety of patterns and designs to be knit in the web. By arranging the position and length of the lugs on the pattern chain these various racking or shogging movements are performed automatically within the limits of the construction of the machine and by changing the ratchet wheels and the shape of the grooves in the drums and making the various adjustments and modifications herein set forth, all of which are described as exemplifying the broad features of novelty of the invention, a still wider variety of racking or shogging movements and consequent patterns or designs in the finished web may be secured.

Having thus described my invention, what I claim as new, and desire to secure by Letters Patent, is:

1. In a circular knitting machine two co-operating sets of needles for knitting ribbed work, one of said sets being divided into two segmental sections, and means for racking said sections successively for a plurality or any less number of steps in either direction in any desired sequence.

2. In a circular knitting machine two co-operating sets of needles for knitting ribbed work, one of said sets being divided into two segmental sections, means for racking said sections successively for a plurality or any less number of steps in either direction in any desired sequence, and for suspending the racking movement to knit plain ribbed work for a predetermined period after the completion of any racking step by both sections.

3. In a circular knitting machine two co-operating sets of needles for knitting ribbed work, one of said sets being divided into two segmental sections, means for racking said sections successively for a plurality or any less number of steps in either direction in any desired sequence, and means for positively preventing the reversal of the racking movement until after the completion of a racking step by both sections.

4. In a circular knitting machine two co-operating sets of needles for knitting ribbed work, one of said sets being divided into two segmental sections, and means for racking said section successively for a plurality or any less number of steps in either direction with any desired sequence in the number and direction of the steps.

5. In a circular knitting machine two co-operating sets of needles for knitting ribbed work, one of said sets being divided into two segmental sections, means for racking said sections successively for a plurality or any less number of steps in either direction with any desired sequence in the number and direction of the steps, and means for suspending the racking movement to knit plain ribbed work for a predetermined period after the completion of any racking step by both sections.

6. In a circular knitting machine, a set of cylinder needles, a set of dial needles divided into two segmental sections, and pattern-controlled means for racking said sections successively for a plurality or any less number of steps in either direction with any desired sequence in the number and direction of the steps.

7. In a circular knitting machine, a set of cylinder needles, a set of dial needles divided into two segmental sections, pattern-controlled means for racking said sections successively for a plurality or any less number of steps in either direction with any desired sequence in the number and direction of the steps, and means for suspending the racking movement to knit plain ribbed work for a predetermined period after the completion of any racking step by both sections.

8. In a circular knitting machine a set of cylinder needles, a set of dial needles divided into two segmental sections, and pattern-controlled means for racking said section successively either one, two or three steps in either direction with any desired sequence in the number and direction of the steps.

9. A knitting machine comprising two co-operating sets of needles for knitting ribbed work, one of said sets being divided into two sections, and means for racking said sections successively for a plurality or any less number of steps in either direction with any desired sequence in the number and direction of the steps.

10. A circular knitting machine comprising a set of cylinder needles, a dial needle bed, a set of dial needles in the dial needle bed, the dial needle bed and dial needles being divided into two segmental sections by the omission of a dial needle and its segment of the dial needle bed at opposite points, a pair of independently movable cams and connections therefrom respectively to the dial needle bed sections, and means for moving said cams to effect the racking of said dial needle bed sections successively for a plurality or any less number of steps in either direction with any desired sequence in the number and direction of the steps.

11. In a circular knitting machine the combination of elements defined in claim 6, together with means for positively preventing the reversal of the racking movement until after the completion of a racking step by both segmental sections.

12. A circular knitting machine comprising a set of cylinder needles, a dial needle bed, a set of dial needles in the dial needle bed, the dial needle bed and dial needles being divided into two segmental sections by the omission of a dial needle and its segment of the dial needle bed at opposite points, a pattern-controlled means for racking said dial needle bed sections successively for a plurality or any less number of steps in either direction with any desired sequence in the number and direction of the steps.

13. A circular knitting machine comprising the construction defined in claim 12, together with means for positively preventing the reversal of the racking movement until after the completion of a racking step by both sections.

14. A circular knitting machine comprising the construction defined in claim 12, together with means for suspending the racking movement to knit plain ribbed work for a predetermined period after the completion of any racking step by both sections.

15. A circular knitting machine comprising a set of cylinder needles, a dial needle bed, a set of dial needles in the dial needle bed, the dial needle bed and dial needles being divided into two segmental sections to permit the successive racking of said sections, a pair of independently movable cams and connections therefrom respectively to the dial needle bed sections, a pair of oppositely reciprocable pawls and two sets of oppositely disposed ratchet teeth associated with each of said cams, a shifting frame supporting the two pair of pawls and movable to permit the engagement of one of the pawls of both pairs with the ratchet teeth and to disengage the other pawls from the ratchet teeth, and pattern-controlled means for moving the shifting frame thereby to effect the racking of said dial needle bed sections successively for a plurality or any less number of steps with any desired sequence in the number and direction of the steps.

16. A circular knitting machine comprising the construction defined in claim 15 in which the pattern-controlled means may also act to move the shifting frame to a neutral position.

17. A circular knitting machine comprising two co-operating sets of needles for knitting ribbed work, one of said sets being divided into two segmental sections, means for racking said section successively in which the racking mechanism includes two independently rotatable cams, a ratchet wheel attached to each cam and provided with reversely disposed ratchet teeth, a shifting frame, four pawl carriers mounted for reciprocable movement in said frame, and provided with pawls co-operating with said ratchet teeth, means for constantly reciprocating the pawl carriers with the pawls for moving the two cams in the same direction reciprocating in opposite phases, and pattern-controlled means for shifting one set of pawls into engagement with and the other set of pawls out of engagement with the ratchet teeth whereby the cams may be moved successively for a plurality or any less number of steps in either direction with any desired sequence in the number and direction of the steps to effect corresponding racking movement of the needles.

In testimony whereof, I have signed my name to this specification.

JOHN H. RICE.